(12) United States Patent
Hansen et al.

(10) Patent No.: US 10,038,322 B2
(45) Date of Patent: Jul. 31, 2018

(54) SYSTEMS AND METHODS FOR CONTROLLING PERFORMANCE PARAMETERS OF AN ENERGY STORAGE DEVICE

(71) Applicant: General Electric Company, Schenectady, NY (US)

(72) Inventors: Lukas Mercer Hansen, Niskayuna, NY (US); Kenneth McClellan Rush, Ballston Spa, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 89 days.

(21) Appl. No.: 15/188,025

(22) Filed: Jun. 21, 2016

(65) Prior Publication Data
US 2017/0366009 A1 Dec. 21, 2017

(51) Int. Cl.
*H02J 3/38* (2006.01)
*H02J 7/00* (2006.01)

(52) U.S. Cl.
CPC .............. *H02J 3/383* (2013.01); *H02J 3/386* (2013.01); *H02J 3/387* (2013.01); *H02J 7/0068* (2013.01)

(58) Field of Classification Search
CPC .. H02J 3/383; H02J 3/386; H02J 3/387; H02J 7/0068
See application file for complete search history.

(56) References Cited

U.S. PATENT DOCUMENTS

| | | |
|---|---|---|
| 2012/0153902 A1 | 6/2012 | Yebka et al. |
| 2013/0099720 A1 | 4/2013 | Chuah et al. |
| 2015/0302723 A1 | 10/2015 | Reade et al. |
| 2016/0092776 A1 | 3/2016 | Hooshmand et al. |

FOREIGN PATENT DOCUMENTS

| | | |
|---|---|---|
| EP | 0310107 | 4/1989 |
| EP | 3010107 | 4/2016 |
| WO | WO 2013086411 | 6/2013 |

OTHER PUBLICATIONS

Extended European Search Report for corresponding EP Application No. 17 175 253.8, date of completion Aug. 9, 2017—6 pages.

*Primary Examiner* — Robert Deberadinis
(74) *Attorney, Agent, or Firm* — Dority & Manning, P.A.

(57) ABSTRACT

Systems and methods for controlling performance parameters for an energy storage device include providing primary control signals to an energy storage device that indicate at least one operating value in a range defined by at least one set point value for one or more performance parameters of the energy storage device. In one embodiment, an actual performance score for the energy storage device operated in accordance with the primary control signals is determined and compared with a required performance score to determine a performance score evaluation parameter. Additional control signals are then determined and provided to the energy storage device in a manner that adjusts the at least one operating value of the one or more primary control signals relative to the at least one set point value for the one or more performance parameters based at least in part on the performance score evaluation parameter.

20 Claims, 3 Drawing Sheets

SYSTEMS AND METHODS FOR CONTROLLING PERFORMANCE PARAMETERS OF AN ENERGY STORAGE DEVICE

FIELD OF THE INVENTION

The present subject matter relates generally to energy storage devices.

BACKGROUND OF THE INVENTION

Energy storage systems have become increasingly used to deliver power to utility grids either as part of standalone energy storage systems or as part of a renewable energy source (e.g. wind generation or solar generation systems) with an integrated energy storage system. Energy storage systems (e.g., battery banks or integrated cells of other energy storage devices) can be particularly helpful when used for frequency stabilization applications in grid connected renewable energy sources. Renewable energy sources can require frequency stabilization features to address the variability that exists within the renewable energy source and help deliver constant active and reactive power to the utility grid. In some grid-tied frequency regulation or frequency response applications, an energy storage system can be charged when the grid frequency is too high and discharged when the grid frequency is too low.

The batteries or other energy storage devices used in grid frequency regulation applications are designed to account for various performance criteria, including size, energy capacity, life expectancy and the like. For example, batteries can be sized at installation to have more energy capacity at the beginning of life (BOL) than is needed, so that as battery capacity degrades over time they will still have enough capacity at end of life (EOL). In some applications, batteries are sized to have 20-50% more capacity at BOL than they do at EOL.

Higher battery performance capabilities at BOL can result in system inefficiencies due to overperformance and excess device wear without compensation. Since batteries have a larger energy capacity window in which to operate at BOL, the batteries will cycle through more Mega-watt-hours (MWh) per day at BOL than at end of life (EOL). The system will effectively behave like gas in a container and use all the available space. This will result in a higher performance score at BOL, but the battery system may not be paid for that higher score and thus gives away performance without being compensated. The increased MWh that cycle through the battery degrade the battery at a faster rate than is necessary.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a method for controlling performance parameters of an energy storage device (e.g., a battery). The energy storage device can be coupled to a power generation source (e.g., a wind energy source or a solar energy source) and configured to regulate power supplied to a utility grid. One or more primary control signals can indicate at least one operating value in a range defined by at least one set point value for one or more performance parameters of the energy storage device. An actual performance score for the energy storage device can be determined based at least in part on operation of the energy storage device in a manner indicated by the one or more primary control signals. A performance score evaluation parameter based at least in part on a comparison of the actual performance score for the energy storage device to a required performance score can be determined. One or more additional control signals can be provided to the energy storage device to adjust the at least one operating value of the one or more primary control signals relative to the at least one set point value for the one or more performance parameters based at least in part on the performance score evaluation parameter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
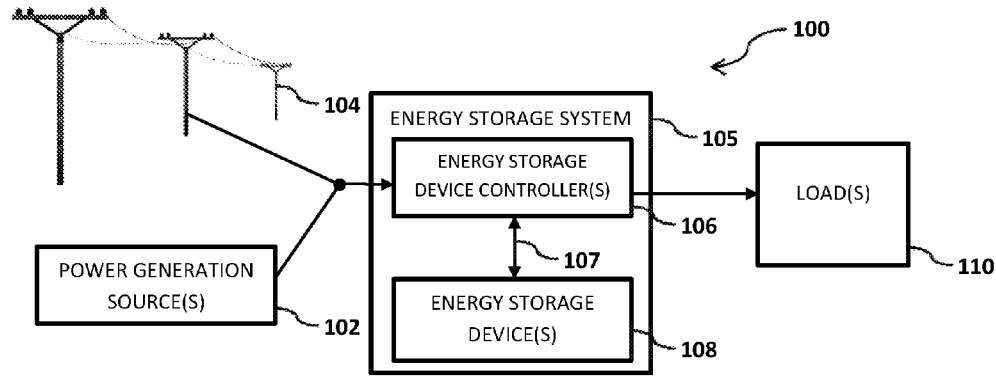
FIG. 1 provides a block diagram depicting an example embodiment of a power generation system according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods of controlling performance parameters for an energy storage device, e.g. a battery. More specifically, performance parameters can be controlled for battery banks that are used in grid frequency regulation applications or other applications in which energy storage devices are coupled to a power generation source for providing power to a utility grid. Such energy storage devices are typically configured to operate in a manner that achieves a required performance score. Required performance scores can be established by operators of the power generation sources or by contracted needs of a utility grid, and sometimes can be defined at different levels for different periods of time depending on available power supply, power demand or other variables. Contractual periods of time for which a predetermined performance score may be required can be selected, for example, from within a range from about 5 minutes to about 100 hours.

Control signals that define operating values for various performance parameters of the energy storage devices can be determined and provided in order to achieve the required performance scores. By repeatedly comparing actual performance scores to required performance scores, performance parameter operating values can be adjusted relative to set point values (e.g., minimum and/or maximum operating limits) for different performance parameters. In some examples, operating values are adjusted towards enhanced values that limit the performance parameters to minimum values required for achieving a required performance score. By keeping the actual performance score above but close to the required performance score, the energy storage system can operate more conservatively when possible in order to improve operating costs and extend overall battery life.

Example aspects of the present disclosure provides many advantages not present in the prior art. For example, performance parameter control for energy storage devices in keeping with the disclosed techniques can provide extended battery life by limiting various factors that can contribute to faster device wear over time. Battery life can be extended by creating smaller state of charge (SOC) operating windows, slower charge and discharge rates, lower operating temperatures, etc. In one simulated example, battery lifetime was extended by reducing the total number of effective charge cycles from 15 cycles per day to 9 cycles per day.

Another advantage realized by the disclosed embodiments involves reducing capital expense when sizing and installing an energy storage system. Capital expenses are reduced because battery efficiency is increased. As such, batteries can perform at required levels for longer periods of time before replacement. Alternatively, smaller and more economical battery configurations can be installed for operation over a given period of time than otherwise possible.

A still further advantage realized by the disclosed embodiments involves reducing operating expenses for HVAC systems that are required to cool high operating temperatures of the battery banks. By reducing the number of battery operating cycles, electrical losses can be reduced as well as the cost of cooling the heat from those losses.

Referring now to the figures, FIG. 1 illustrates one embodiment of an example power generation system 100 according to example aspects of the present disclosure. As shown, the power generation system 100 includes one or more power generation sources 102, a power grid 104, an energy storage system 105 and one or more loads 110. In some examples, the power generation source(s) 102 can include a renewable energy source. In some examples, power generation source(s) 102 can include a wind energy source such as a farm of wind turbines. In other examples, the power generation source(s) 102 can include a solar energy source such as a bank of photovoltaic (PV) cells.

Energy storage system 105 can be provided to serve multiple purposes within power generation system 100. In some applications, energy storage system 105 provides a measure of frequency regulation for utility grid 104 by compensating for variability that exists within the power generation source and helping deliver constant active and reactive power to the utility grid 104. For example, energy storage system 105 can be charged when the grid frequency is too high and discharged when the grid frequency is too low.

Referring still to FIG. 1, energy storage system 105 can be an electrical energy storage (EES) system that includes one or more energy storage device (ESD) controllers 106 and one or more energy storage devices 108. ESD controller 106 can control various aspects of the energy storage system 105 by relaying one or more control signals 107 to the one or more energy storage devices 108. ESD controller 106 can include one or more control devices, such as sensors, controllers, regulators, processors, etc. that can monitor various aspects of the energy storage system 105. For example, ESD controller 106 can monitor and adjust operating values for one or more performance parameters of the energy storage device(s) 108, including but not limited to charge rates, state of charge (SOC) windows, current levels, voltage levels, frequency levels, recharge resistance levels, temperature levels, and the like.

Energy storage device(s) 108 can include one or more electrochemical cells, such as but not limited to a bank of batteries. Battery banks can be configured in a variety of manners including various arrangements of strings of cells in series to define a particular voltage level and combined strings of cells in parallel to define a particular capacity. The energy storage device(s) 108 can include at least one of a lithium ion battery, a sodium nickel chloride battery, a sodium sulfur battery, a nickel metal hydride battery, a nickel cadmium battery, a fuel cell, or any other suitable battery. Further, the energy storage device(s) 108 can be coupled to an inverter to convert DC power provided by the energy storage device(s) 108 to AC power for supply to power grid 104 or other AC application.

Figure 2:
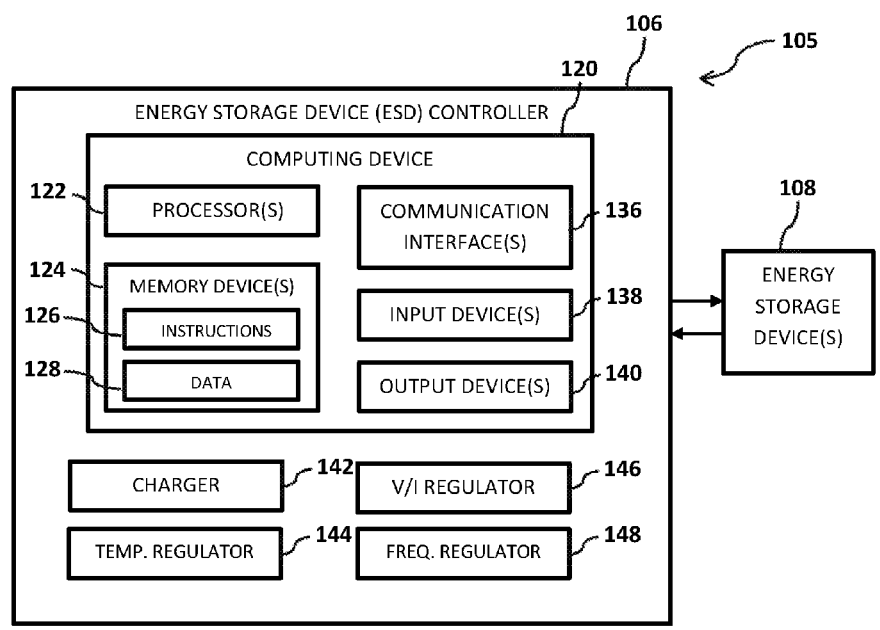
FIG. 2 provides a block diagram depicting an example embodiment of an energy storage system according to the present disclosure.

Referring to FIG. 2, an example ESD controller 106 can include any number of control devices. As shown, for example, ESD controller 106 can include one or more computing device(s) 120 and one or more implementation devices such as a charger 142, temperature regulator 144, voltage/current (V/I) regulator 146 and frequency regulator 148. The computing device 120 provides control signals to the implementation device(s) 142-148 that help define and limit charge and discharge signals for operating the energy storage device(s) 108. Implementation devices 142-148 can be coupled to the energy storage device(s) 108 via one or more contactors, depending on the number and configuration of cells within energy storage device(s) 108.

Computing device(s) 120 can include one or more processor(s) 122 and associated memory device(s) 124 configured to perform a variety of computer-implemented functions and/or instructions (e.g., performing the methods, steps, calculations and the like and storing relevant data as disclosed herein). Instructions 126 when executed by the one or more processors 122 can cause the one or more processors 122 to perform operations, including providing control commands to the charger 142, temperature regulator 144, voltage/current regulator 146, frequency regulator 148, the energy storage devices 108 and/or other aspects of the energy storage system 105 and/or power generation system 100.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The one or more processors 122 also can be configured to compute advanced control algorithms.

Additionally, the memory device(s) 124 can include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 124 can be configured generally to store suitable computer-readable instructions 126 that, when implemented by the processor(s) 122, configure the ESD controller 106 and computing device 120 to perform the various functions as described herein.

Memory device(s) 124 also can be configured to store data 128, such as but not limited to variables stored or calculated in accordance with the disclosed technology. For example, data 128 can include performance parameter data including set point values and/or enhanced values for the various performance parameters that define one or more limits to operating value ranges for the performance parameters. Data 128 also can include performance score data including required performance scores and actual performance scores determined in accordance with the disclosed embodiments. Data 128 still further can include performance score evaluation parameter data that provides a quantifiable parameter for evaluating the actual performance scores relative to required performance scores.

Additionally, computing device 120 within ESD controller 106 also can include a communications interface 136 to facilitate communications between ESD controller 106 and the various components of the energy storage system 105 and/or power generation system 100. Communications interface 136 can include a sensor interface (e.g., one or more analog-to-digital converters) to permit signals transmitted from one or more sensors to be converted into signals that can be understood and processed by the one or more processors 122. Communications interface 136 can be configured to accommodate a variety of different signal communication infrastructures and protocols, including wired and/or wireless connections or other signal transmission arrangements over one or more signal networks.

The computing device 120 can include various input/output devices for providing and receiving information to/from a user. For instance, an input device 138 can include devices such as a touch screen, touch pad, data entry keys, and/or a microphone suitable for voice recognition. Input device 138 can be employed by a user to provide manual entry of data, performance parameters, control signal parameters and the like. An output device 140 can include audio or visual outputs such as speakers or displays for indicating performance scores, control signal information, user interfaces related to such information, and the like.

Figure 3:
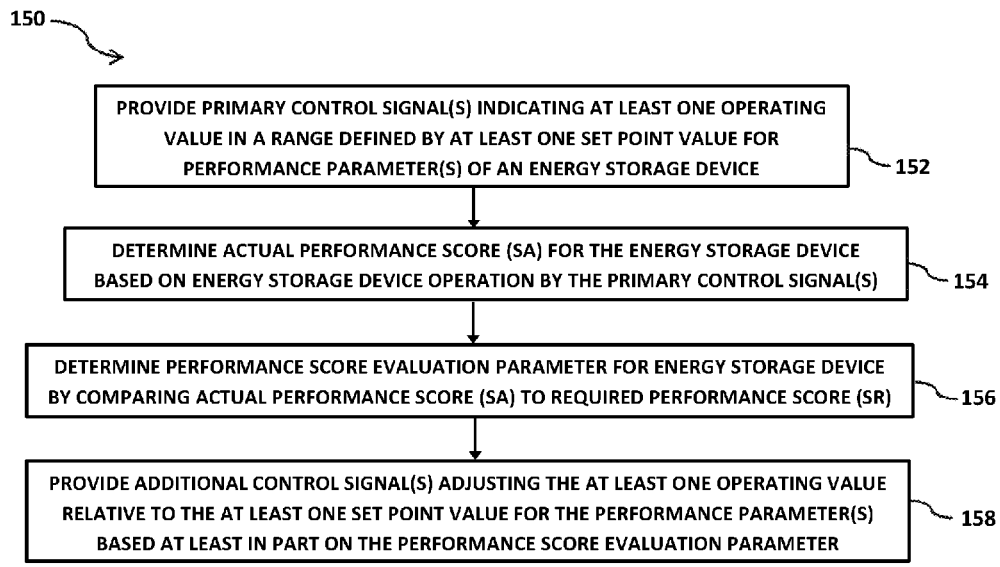
FIG. 3 provides a flow diagram depicting an example method of controlling performance parameters for an energy storage system according to the present disclosure.

Referring now to FIG. 3, a flow diagram of a method 150 of controlling performance parameters for an energy storage device is depicted. Method 150 can include providing one or more primary control signals to an energy storage device (152). In some applications, the energy storage device is coupled to a power generation source and is configured to regulate power supplied to a utility grid, such as through the configuration depicted in FIG. 1. The primary control signals can provide operating values for one or more performance parameters for operating the energy storage device(s) in a manner consistent with their intended application (e.g., grid frequency control, excess energy storage, etc.) The primary control signals provided at 152 can indicate at least one operating value in a range defined by at least one set point value for one or more performance parameters of the energy storage device.

Set point values can indicate predetermined minimum and/or maximum operating limits for the various performance parameters that are designed to help accomplish specific goals such as efficiency ratings, lifetime expectancies, performance scores, etc. For example, a set point value for the operating temperature of an energy storage device could be a predetermined maximum temperature limit of 23 degrees Celsius. In another example, set point values for a state of charge (SOC) window for an energy storage device can include an upper or maximum set point value and a lower or minimum set point value. An example SOC window of 10-80% would be defined by a lower set point value of 10% and an upper set point value of 80%.

The performance parameters for an energy storage device for which operational values are provided via control signals at (152) can include a variety of parameters. In one example, performance parameters include a useable state-of-charge (SOC) window defined by an upper set point value and a lower set point value. Additional example performance parameters include a charging voltage level and/or discharging voltage level. Operating values for a charging voltage level can be defined in terms of an upper charging voltage limit, while operating values for a discharging voltage level can be defined in terms of a lower discharging voltage limit. Various performance parameters related to temperature can include a battery temperature or cell temperature for an energy storage device and/or a building temperature for a structure housing the energy storage device(s) which can be regulated by HVAC systems or the like. Set point values for temperature-related performance parameters can be defined, for example, by respective upper limits for the various temperature parameters. Still further example performance parameters can include a grid frequency response deadband defined by upper and/or lower frequency limits, a power versus grid frequency droop parameter defined by at least one frequency droop limit set point value, a grid high voltage ride through (HVRT) parameter defined by an upper limit and a grid low voltage ride through (LVRT) parameter defined by a lower limit.

Referring still to FIG. 3, an actual performance score (SA) for the energy storage device(s) can be determined at (154). Actual performance scores from (154) can be determined by evaluating the performance of the energy storage device when operating the energy storage device in a manner indicated by the one or more primary control signals provided at (152). The criteria for determining a performance score at (154) can include a variety of parameters, including the performance parameters from (152) as well as cost/benefit factors for evaluating performance of the energy storage device and/or the power generation system (e.g., provided power, frequency regulation effectiveness, device efficiency, total number of operational cycles, monetary cost or savings, etc.)

The method includes determining a performance score evaluation parameter for the energy storage device (156). The performance score evaluation parameter provides an indication of how the actual performance score (SA) determined at (154) compares with a required performance score (SR). The performance score evaluation parameter can compare an actual performance score (SA) to a required performance score (SR) in a variety of different specific ways, for example, by calculating a difference between the SA and SR values, calculating a ratio of the SA and SR values, performing a logical greater than or less than comparison, or other factor. The performance score evaluation parameter determined at (156) can be useful to determine whether the actual performance score exceeds the required performance score.

Figure 4:
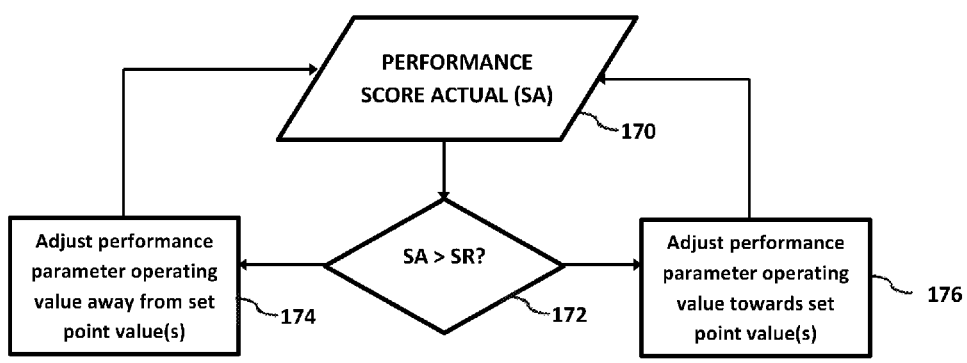
FIG. 4 provides a flow diagram depicting operational aspects related to controlling performance parameters for an energy storage device according to the present disclosure.
Figure 5:
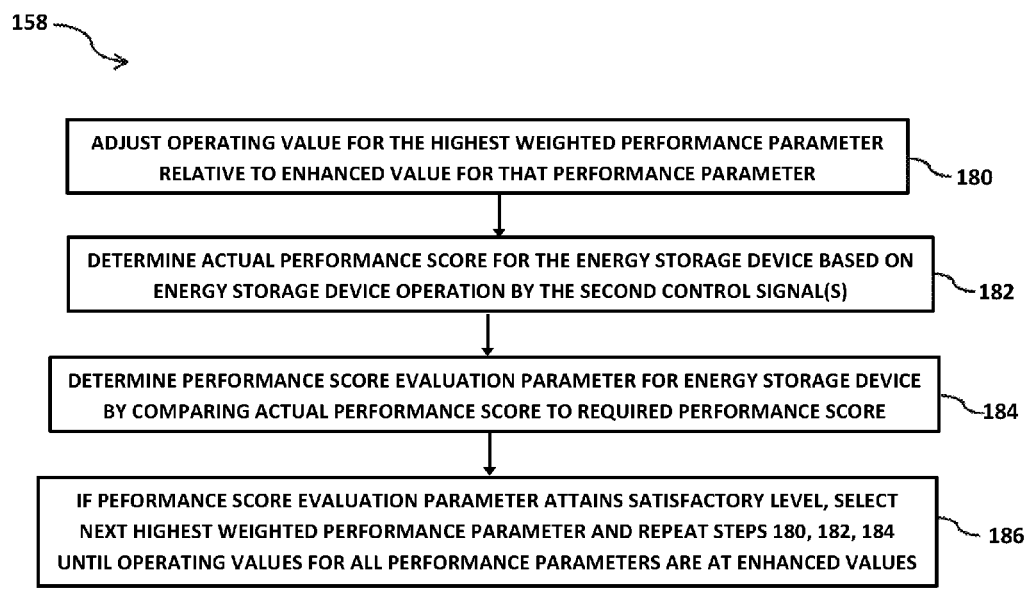
FIG. 5 provides a flow diagram depicting specific aspects related to providing additional control signals for an energy storage device according to the present disclosure.

At (158), the method includes providing one or more additional control signals to the energy storage device that are adjusted based at least in part on the performance score evaluation parameter determined at (156). In general, the one or more additional control signals provided at (158) adjust the operating value(s) of the one or more primary control signals relative to the at least one set point value for selected performance parameters. More specific examples of how additional control signals can be determined are depicted in FIGS. 4 and 5. It should be appreciated that the control signals referred to in (158) as "additional control signals" can be adjusted on multiple occasions in an iterative fashion in order to achieve the disclosed objectives. As such, control signals can actually be adjusted more than just a single time relative to the primary control signals provided in (152) and still be within the purview of the adjusted "additional control signals."

Referring now to FIG. 4, a logic diagram depicts particular operational aspects of certain aspects from FIG. 3 in a method for controlling performance parameters of an energy storage device. Element 170 of FIG. 4 represents the determination of an actual performance score (SA), such as determined in (154) of FIG. 3. Element 172 represents a comparison of the SA determined at 170 to a required performance score (SR). If the actual performance score (SA) is determined at 172 to be greater than the required performance score (SR), such as indicated by the performance score evaluation parameter at 156, then the operating value for one or more performance parameters can be adjusted away from a set point value at 174 in order to achieve additional operational efficiencies. Adjusting operating values at 174 also can be considered adjusting towards enhanced values such as minimum operating values for an energy storage system that are still capable of achieving required performance score results. If the actual performance score (SA) is determined at 172 to be less than the required performance score (SR), then the operating value for one or more performance parameters can be adjusted towards the set point value at 176. Adjusting operating values at 176 also can be considered adjusting away from enhanced values towards maximum operating values or set point values for an energy storage system. By allowing an energy storage device to operate towards outer limits defined by set point values, the device is more likely to achieve a required performance score.

Referring now to FIG. 5, additional aspects related to providing additional control signals to an energy storage device such as indicated at (158) of FIG. 3 are depicted. FIG. 5 illustrates how additional control signals can be iteratively determined to enhance one performance parameter at a time. By adjusting operating values in additional control signals relative to primary control signals on a per parameter basis, adjustments to actual performance scores can be made intentionally and in a controlled manner so as not to jeopardize system effectiveness. Each parameter adjustment seeks to provide improvements in battery efficiency and overall system cost savings while ensuring that the actual performance score exceeds the required performance score.

At (180), the method involves adjusting the operating value for a first performance parameter relative to an enhanced value or to the at least one set point value for the first performance parameter. At (182) the method involves determining an actual performance score for the energy storage device based at least in part on operation of the energy storage device in a manner indicated by the one or more additional control signals. At (184) the method involves determining a performance score evaluation parameter based at least in part on a comparison of the actual performance score for the energy storage device to a required performance score. Blocks (182) and (184) are similar to previously discussed blocks (154) and (156), but are determined relative to the additional control signals as opposed to the primary control signals.

In some examples, the first performance parameter adjusted at (180) is a highest weighted parameter relative to its contribution to the actual performance score for the energy storage device. In other words, if changes in operating value for a given performance parameter would potentially yield the largest change in actual performance score relative to other performance parameters, that given performance parameter would be the highest weighted parameter. The operating values for the highest weighted performance parameter can be adjusted at (180) relative to the set point values until an enhanced value is achieved. An enhanced value can correspond to a value that most effectively balances the desired efficiency of system operation while still attaining required performance scores.

In one example, consider the highest weighted performance parameter adjusted at (180) to correspond to an SOC window defined by upper and lower set point values of 80% and 10%. If operating values for the SOC window are set at 20-60% and the actual performance score exceeds the required performance score, then the operating values for the SOC window can be adjusted at (180) towards a predetermined enhanced value (e.g., an even smaller window, for example, 30-40%).

Referring still to FIG. 5, if operating values for a first performance parameter are fully adjusted relative to set point values towards an enhanced value and actual performance scores continue to exceed required performance scores, then (180), (182) and (184) are repeated at (186) for second and subsequent performance parameters until operating values for all performance parameters are at enhanced levels or until an actual performance score drops below a required performance score. At any point when an actual performance score drops below a required performance score, operating values can be adjusted towards set point values in a manner that increases performance potential until the actual performance score exceeds the required performance score. In some examples, the second and subsequent performance parameters are determined to decrease in weight respectively relative to the first highest weighted performance parameter.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of controlling performance parameters for an energy storage device, the method comprising:
   providing one or more primary control signals to an energy storage device coupled to a power generation source, wherein the one or more primary control signals indicate at least one operating value in a range defined at least in part by at least one set point value for one or more performance parameters of the energy storage device;
   determining an actual performance score for the energy storage device based at least in part on operation of the energy storage device in a manner indicated by the one or more primary control signals;
   determining a performance score evaluation parameter based at least in part on a comparison of the actual performance score for the energy storage device to a required performance score; and
   providing one or more additional control signals to the energy storage device, wherein the one or more additional control signals adjust the at least one operating value of the one or more primary control signals relative to the at least one set point value based at least in part on the performance score evaluation parameter.

2. The method of claim 1, wherein providing one or more additional control signals to the energy storage device comprises adjusting the at least one operating value of the one or more primary control signals towards an enhanced value when the performance score evaluation parameter indicates that the actual performance score exceeds the required performance score, and wherein providing one or more additional control signals to the energy storage device comprises adjusting the at least one operating value of the one or more primary control signals away from an enhanced value when the performance score evaluation parameter indicates that the actual performance score is less than the required performance score.

3. The method of claim 1, wherein providing one or more additional control signals to the energy storage device further comprises:
   adjusting the operating value for a first performance parameter towards an enhanced value for the first performance parameter;
   determining an actual performance score for the energy storage device based at least in part on operation of the energy storage device in a manner indicated by the one or more additional control signals;
   determining a performance score evaluation parameter based at least in part on a comparison of the actual performance score for the energy storage device to a required performance score; and
   repeating adjusting the operating value for a first performance parameter, determining an actual performance score and determining a performance score evaluation parameter for subsequent performance parameters when the performance score evaluation parameter indicates that the actual performance score exceeds the required performance score.

4. The method of claim 1, wherein the first performance parameter has a highest weight among the one or more performance parameters relative to its contribution to the actual performance score for the energy storage device, and wherein subsequently adjusted performance parameters have less weight relative to the first performance parameter.

5. The method of claim 1, wherein the one or more performance parameters comprise a useable state-of-charge (SOC) window and wherein the at least one set point value for the useable SOC window includes an upper set point value and a lower set point value.

6. The method of claim 1, wherein the one or more performance parameters comprise a charging voltage level and a discharging voltage level, wherein the at least one set point value for the charging voltage level defines an upper charging voltage limit, and wherein the at least one set point value for the discharging voltage level defines a lower discharging voltage limit.

7. The method of claim 1, wherein the one or more performance parameters comprise a cell temperature for the energy storage device or a building temperature for a building housing the energy storage device, and wherein the at least one set point value defines an upper limit for the cell temperature or an upper limit for the building temperature.

8. The method of claim 1, wherein the one or more performance parameters comprise a grid frequency response deadband, and wherein the at least one set point value defines a lower limit for the frequency deadband and an upper limit for the frequency deadband.

9. The method of claim 1, wherein the one or more performance parameters comprise a power versus grid frequency droop parameter, and wherein the at least one set point value defines a frequency droop limit.

10. The method of claim 1, wherein the one or more performance parameters comprise a grid high voltage ride through (HVRT) parameter and a grid low voltage ride through (LVRT) parameter, and wherein the at least one set point value for the grid HVRT parameter defines an upper limit, and wherein the at least one set point value for the grid LVRT parameter defines a lower limit.

11. The method of claim 1, wherein the energy storage device coupled to the power generation source is configured to regulate the power supplied to the utility grid.

12. An energy storage system, comprising:
    an energy storage device coupled to a power generation source and configured to regulate power supplied to a utility grid; and
    an energy storage device controller in communication with the energy storage device and configured to:
       provide one or more primary control signals to the energy storage device, wherein the one or more primary control signals indicate at least one operating value in a range defined by at least one set point value for one or more performance parameters of the energy storage device;
       determine an actual performance score for the energy storage device based at least in part on operation of the energy storage device in a manner indicated by the one or more primary control signals;
       determine a performance score evaluation parameter based at least in part on a comparison of the actual performance score for the energy storage device to a required performance score; and
       provide one or more additional control signals to the energy storage device, wherein the one or more additional control signals adjust the at least one operating value of the one or more primary control signals relative to the at least one set point value for the one or more performance parameters based at least in part on the performance score evaluation parameter.

13. The energy storage system of claim 12, wherein the energy storage device comprises a battery bank and wherein the power generation source comprises one of a wind power source and a solar power source.

14. The energy storage system of claim 12, wherein providing one or more additional control signals to the energy storage device comprises adjusting the at least one operating value of the one or more primary control signals towards an enhanced value when the performance score evaluation parameter indicates that the actual performance score exceeds the required performance score, and wherein providing one or more additional control signals to the energy storage device comprises adjusting the at least one operating value of the one or more primary control signals away from an enhanced value when the performance score evaluation parameter indicates that the actual performance score is less than the required performance score.

15. The energy storage system of claim 12, wherein providing one or more additional control signals to the energy storage device further comprises:
   adjusting the operating value for a first performance parameter towards an enhanced value for the first performance parameter;
   determining an actual performance score for the energy storage device based at least in part on operation of the energy storage device in a manner indicated by the one or more additional control signals;
   determining a performance score evaluation parameter based at least in part on a comparison of the actual performance score for the energy storage device to a required performance score; and
   repeating adjusting the operating value for a first performance parameter, determining an actual performance score and determining a performance score evaluation parameter for subsequent performance parameters when the performance score evaluation parameter indicates that the actual performance score exceeds the required performance score.

16. The energy storage system of claim 12, wherein the first performance parameter has a highest weight among the one or more performance parameters relative to its contribution to the actual performance score for the energy storage device, and wherein subsequently adjusted performance parameters decrease in weight respectively.

17. The energy storage system of claim 12, wherein the one or more performance parameters comprise one or more of a useable state-of-charge (SOC) window, a charging voltage level, a discharging voltage level, a cell temperature for the energy storage device, a building temperature for a building housing the energy storage device, a grid frequency response deadband, a power versus grid frequency droop parameter, a grid high voltage ride through (HVRT) parameter, and a grid low voltage ride through (LVRT) parameter.

18. A method for regulating frequency in an energy storage system, comprising:
   charging and discharging an energy storage device from an energy source in a manner that regulates the power supplied from the energy source to a utility grid in accordance with a required performance score;
   providing one or more primary control signals to the energy storage device, wherein the one or more primary control signals indicate at least one operating value in a range defined by at least one set point value for one or more performance parameters of the energy storage device;
   determining an actual performance score for the energy storage device based at least in part on operation of the energy storage device in a manner indicated by the one or more primary control signals;
   determining a performance score evaluation parameter based at least in part on a comparison of the actual performance score for the energy storage device to the required performance score; and
   providing one or more additional control signals to the energy storage device, wherein the one or more additional control signals adjust the at least one operating value of the one or more primary control signals relative to the at least one set point value for the one or more performance parameters based at least in part on the performance score evaluation parameter.

19. The method of claim 18, wherein the first performance parameter has a highest weight among the one or more performance parameters relative to its contribution to the actual performance score for the energy storage device, and wherein subsequently adjusted performance parameters decrease in weight respectively.

20. The method of claim 18, wherein the one or more performance parameters comprise one or more of a useable state-of-charge (SOC) window, a charging voltage level, a discharging voltage level, a cell temperature for the energy storage device, a building temperature for a building housing the energy storage device, a grid frequency response deadband, a power versus grid frequency droop parameter, a grid high voltage ride through (HVRT) parameter, and a grid low voltage ride through (LVRT) parameter.

* * * * *